United States Patent
Latter et al.

(10) Patent No.: US 7,068,761 B2
(45) Date of Patent: *Jun. 27, 2006

(54) METHOD AND SYSTEM FOR CANCELING UNWANTED TELEPHONE CALLS

(75) Inventors: Teresa Farias Latter, Kildeer, IL (US); Nancy Ann Book, Naperville, IL (US); Mary Louise Hardzinski, Palatine, IL (US); James Thomas Maciejewski, Spring Grove, IL (US); Thomas Joseph McBlain, Arlington Heights, IL (US); Diana Inara Tiliks, Elk Grove, IL (US); Paul R. Wilczynski, Cary, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/811,614

(22) Filed: Mar. 29, 2004

(65) Prior Publication Data

US 2004/0264668 A1    Dec. 30, 2004

Related U.S. Application Data

(63) Continuation of application No. 10/209,184, filed on Jul. 30, 2002, now Pat. No. 6,765,994, which is a continuation of application No. 09/261,012, filed on Mar. 2, 1999, now Pat. No. 6,453,019.

(51) Int. Cl.
*H04M 1/64* (2006.01)

(52) U.S. Cl. .............. 379/67.1; 379/76; 379/88.11; 379/88.12; 379/88.13; 379/88.16; 379/88.19; 379/201.01; 379/201.06; 379/201.07; 379/201.12

(58) Field of Classification Search .............. 379/67.1, 379/76, 88.11, 88.12, 88.13, 88.16, 88.19, 379/201.01, 201.06, 201.07, 201.12, 88.2, 379/88.21

See application file for complete search history.

(56) References Cited

U.S. PATENT DOCUMENTS

| | | | |
|---|---|---|---|
| 4,926,470 A | 5/1990 | Sanford | 379/199 |
| 5,029,198 A | 7/1991 | Walpole et al. | 379/88.23 |
| 5,031,205 A | 7/1991 | Phillips | 379/88.23 |
| 5,327,486 A | 7/1994 | Wolff et al. | 379/93.23 |
| 5,434,906 A | 7/1995 | Robinson et al. | 379/88.23 |
| 5,467,388 A | 11/1995 | Redd, Jr. et al. | 379/196 |
| 5,471,519 A | 11/1995 | Howe et al. | 379/88.76 |
| 5,555,299 A | 9/1996 | Maloney | 379/212 |
| 5,579,379 A | 11/1996 | D'Amico et al. | 379/196 |
| 5,604,791 A | 2/1997 | Lee | 379/88.21 |

(Continued)

OTHER PUBLICATIONS

TVOFFER.com: *Easy Hang Up,* May 21, 1998, Internet web page.

(Continued)

*Primary Examiner*—Allan Hoosain
(74) *Attorney, Agent, or Firm*—Brinks Hofer Gilson & Lione

(57) ABSTRACT

The present method and system enable a called party to cancel an unwanted call and send a message to the calling party. The method and system are activated in response to a plurality of inputs provided by the called party. In response to the input provided by the called party, a custom or a standard message can be transmitted to the calling party. A confirmation message can also be transmitted to the called party. The method and system can be implemented in conjunction with other systems that are also activated in response to an input from the called party.

20 Claims, 7 Drawing Sheets

U.S. PATENT DOCUMENTS

| | | | |
|---|---|---|---|
| 5,625,676 A | 4/1997 | Greco et al. | 379/88.14 |
| 5,651,053 A | 7/1997 | Mitchell | 379/88.26 |
| 5,652,789 A | 7/1997 | Miner et al. | 379/201 |
| 5,680,447 A | 10/1997 | Diamond et al. | 379/215.01 |
| 5,752,191 A * | 5/1998 | Fuller et al. | 455/445 |
| 5,946,386 A | 8/1999 | Rogers et al. | 379/265 |
| 6,453,019 B1 * | 9/2002 | Latter et al. | 379/67.1 |

OTHER PUBLICATIONS

*Easy Hang Up,* May 21, 1998, Internet web page.

Kevin O'Hanlon, *Phone Butler Ends Unwanted Calls,* Sep. 15, 1997, Internet Web Page.

*The Phone Butler,* May 21, 1998, Internet web page.

* cited by examiner

US 7,068,761 B2

METHOD AND SYSTEM FOR CANCELING UNWANTED TELEPHONE CALLS

This application is a continuation division of application Ser. No. 10/209,184, filed Jul. 30, 2002 now U.S. Pat. No. 6,765,994, which is hereby incorporated by reference herein, which is a continuation of application Ser. No. 09/261,012, filed Mar. 2, 1999, U.S. Pat. No. 6,453,019.

BACKGROUND

The present invention relates generally to telecommunications services and more particularly to canceling unwanted telephone calls.

Telecommunications system users commonly receive unwanted telephone calls. These calls are often placed by callers, such as telemarketers, whose identities are not revealed by traditional caller identification systems. Accordingly, the user does not discover the identity of the caller until after the user has answered the call and has begun speaking with the caller. Once the user has begun speaking with the caller, many users find it difficult to end the call even if it is unwanted. The callers are often aggressive and the user typically does not want to be perceived as being rude to the callers. Accordingly, the user may be forced to engage in unwanted telephone calls for extended periods of time because they do not have what they view as a polite way of ending the calls.

One system that enables a user to disconnect an unwanted call and send a message to the caller, in what the user might view as a polite manner, is disclosed in U.S. Pat. No. 5,651,053 to Mitchell. The system disclosed in Mitchell disconnects an unwanted call and sends a message to the caller in response to the user hanging up, or performing a flash hook at (i.e. hanging up) their telephone. However, telecommunications service providers typically offer a number of other services, such as three-way calling, that are initiated by the user first performing a flash hook at their telephone and then providing some additional input to signify the service sought by the user. Since the system described in Mitchell is automatically activated by the user performing a flash hook, this system cannot be used in conjunction with other services that are activated by the user performing a flash-hook. Therefore a system that overcomes these deficiencies is needed.

DETAILED DESCRIPTION OF THE PRESENTLY PREFERRED EMBODIMENTS

By way of introduction, the preferred embodiments described below include a method and system for canceling a telephone call that has been established between a calling communication station and a called communication station. In one embodiment, a called party at the called communication station provides a plurality of inputs that are transmitted from the called communication station to a telecommunications network. The plurality of inputs can vary depending upon the type of action sought by the called party. The plurality of inputs are analyzed to determine what action the called party is seeking. In response to a determination of the action sought, the call can be canceled. In addition, a message can be transmitted to the calling communication station and the called communication station.

Figure 1:
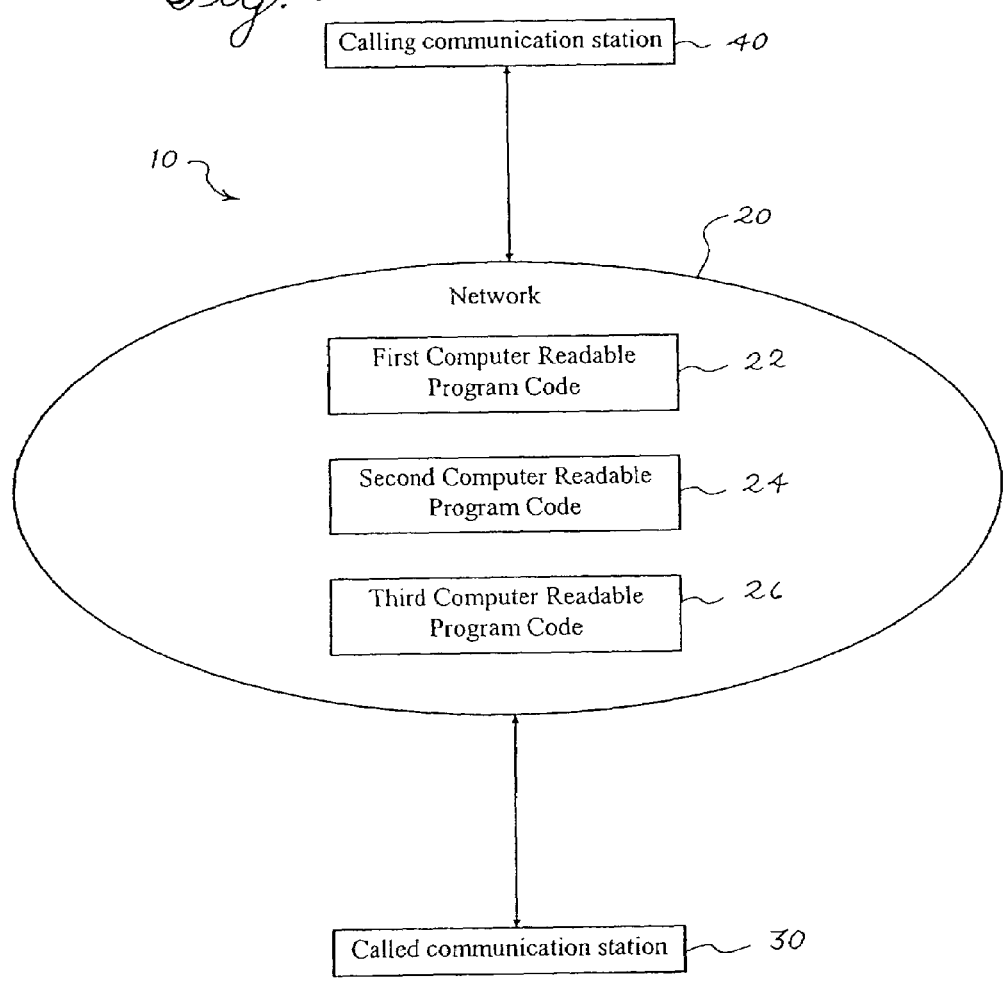
FIG. 1 is a block diagram of a telecommunications system of a preferred embodiment.

By way of example, FIG. 1 depicts a system 10 of a preferred embodiment. The system 10 comprises a network 20, a called communication station 30 coupled with the network 20 and a calling communication station 40 coupled with the network 20. The term "coupled with," as used herein, means directly coupled with or indirectly coupled with through one or more components. The network 20 preferably comprises a computer usable medium having first, second and third computer readable program codes 22, 24, 26 embodied therein. It is important to note that while the program codes 22, 24, 26 have been shown as three separate elements, their functionality can be combined and/ or distributed. It is also important to note that "medium" is intended to broadly include any suitable medium including analog or digital, hardware or software, now in use or developed in the future.

The system 10 is preferably implemented in a telecommunications network. Alternatively, the system 10 can be implemented in a computer network or any other network that is adapted to transmit, store and retrieve information. The calling communication station 40 and the called communication station 30 preferably comprise analog telephone stations. According to an alternative embodiment, the communication stations 30, 40 can comprise any suitable communication station adapted for use in the present embodiments.

Figure 2:
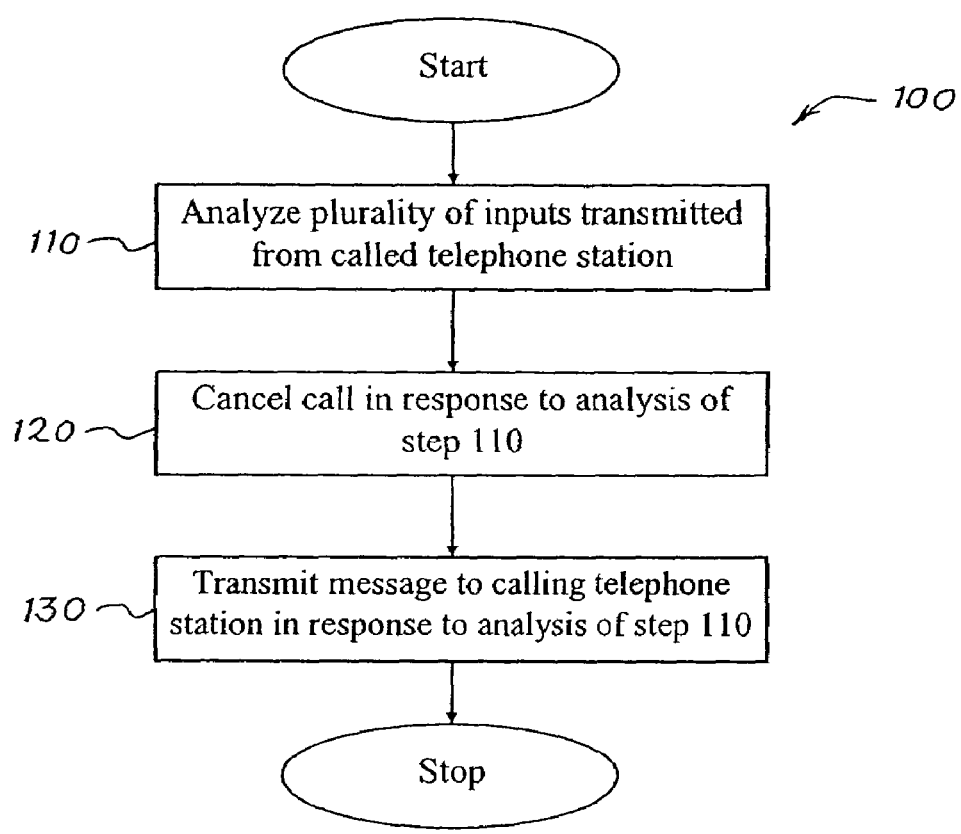
FIG. 2 is a flow chart of a method of a preferred embodiment for canceling a telephone call and transmitting a message to the calling communications station.

The system 10 of FIG. 1 can be used to implement the method 100 depicted in FIG. 2. Assume for purposes of this example that a call originating from calling communication station 40 has been established between calling communication station 40 and called communication station 30. When a called party at the called communication station 30 decides to cancel the call, the called party causes a plurality of inputs to be transmitted from the called communication station 30 to the network 20. The first computer readable program code 22 receives the plurality of inputs and analyzes the plurality of inputs to determine what action the called party seeks (step 110, FIG. 2). If it is determined that the called party seeks to cancel the call and transmit a message to the calling communication station 40, the second computer readable program code 24 cancels the call (step 120). After the call has been canceled, the third computer readable program code 26 transmits a message to the calling communication station 40 (step 130).

Figure 3:
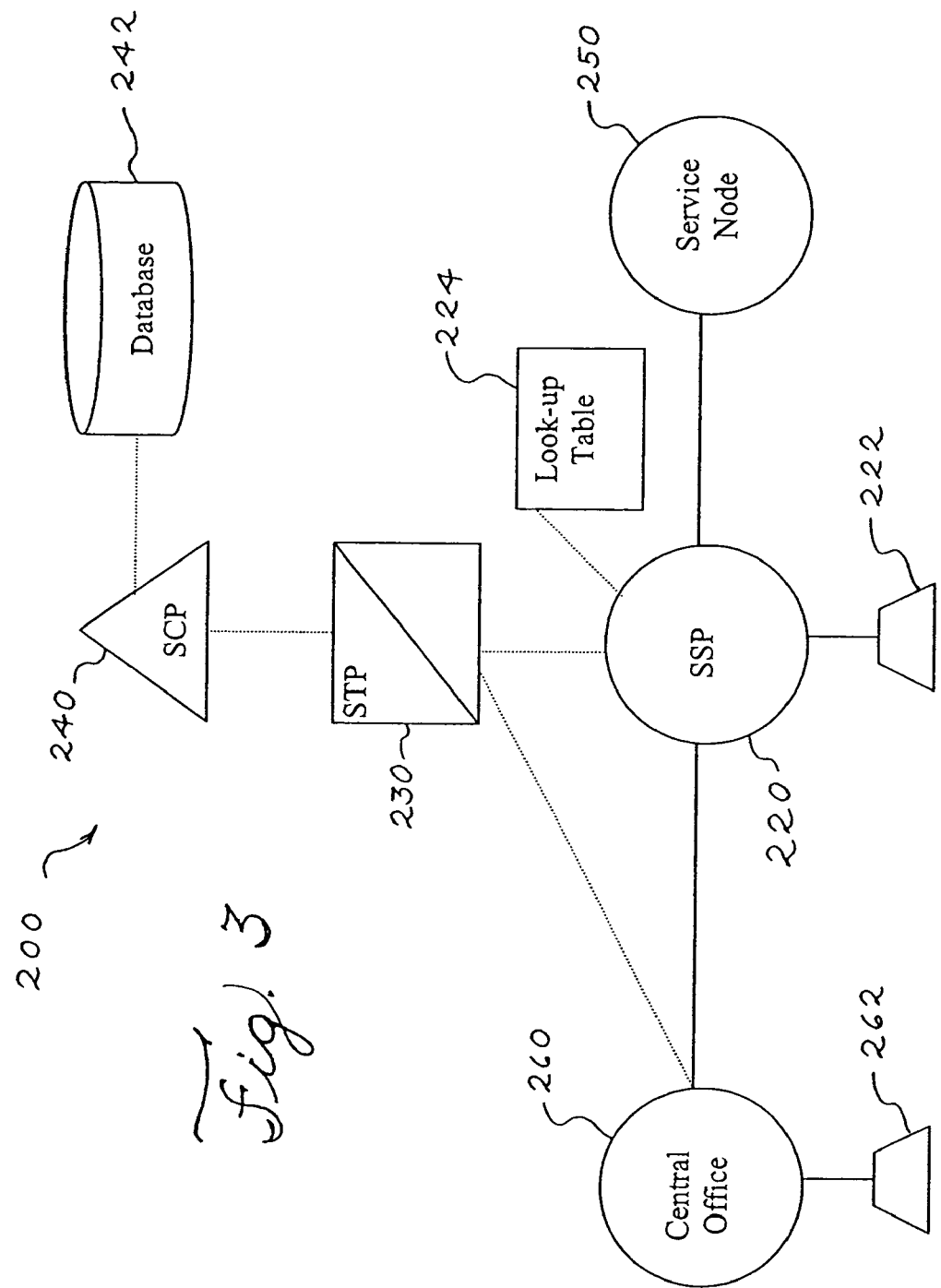
FIG. 3 is a block diagram of a first preferred embodiment of the telecommunications system of FIG. 1.

By way of further example, FIG. 3 depicts a preferred embodiment of the system 10 described above. The system 200 comprises a service switching point (SSP) 220, a look-up table 224, a signal transfer point (STP) 230, a service control point (SCP) 240, a SCP database 242, a service node (SN) 250, a central office 260, called telephone station 222, and calling telephone station 262. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 220 preferably comprises an AIN switch that routes calls, recognizes and responds to triggers, generates queries to obtain call control information, and responds to returned call control information. SSP 220 connects called telephone station 222 with central office 260 to enable calls to be placed by and established between called telephone station 222 and calling telephone station 262. SSP 220 is preferably coupled with look-up table 224 and preferably communicates with SCP 240, central office 260 and SN 250 by utilizing a signaling protocol such as Signaling System 7 (SS7) or other such signaling protocols as presently known to those skilled in the art or developed in the future. SSP 220 preferably generates queries to SCP 240 and receives and responds to responses to the queries returned from SCP 240.

SSP 220 can disconnect and forward telephone calls that have been established between calling telephone station 262 and called telephone station 222. SSP 220 can forward calls to SN 250 through standard call transfer capabilities. SSP 220 is preferably coupled with look-up table 224 such that SSP 220 can access the information stored within look-up table 224 as described herein.

Look-up table 224 preferably comprises a database that contains information regarding the implementation of different services provided by SSP 220 and SCP 240. Each service is preferably correlated with at least one entry that identifies the specific input that is required to activate the service and can also include call control information that enables the SSP 220 to implement the service. This information can be searched to determine the service sought by the called party. Look-up table 224 is preferably coupled with SSP 220 but can also be internal to SSP 220. Alternatively, look-up table 224 can be located anywhere within the network or it can be located within any other computer system that is connected to network through TCP/IP protocol or otherwise.

STP 230 preferably comprises a network element that transfers signaling communications in response to signaling protocols such as SS7 or other such signaling protocols as presently known to those skilled in the art or developed in the future. STP 230 preferably transfers queries from SSP 220 to SCP 240 and transfers responses to the queries from SCP 240 to SSP 220.

SCP 240 preferably comprises an AIN element that stores call control information and receives and responds to queries. SCP 240 preferably stores call control information in SCP database 242 and can access the stored call control information. SCP 240 receives queries generated by SSP 220 and preferably responds to the queries by performing database searches to locate the requested call control information or caller identification information as known to those skilled in the art. SCP can also store the call control information that is required to determine the type of action sought by the called party. SSP can request this information by generating a query. SCP 240 can respond to such a query by accessing the requested information and returning it to SSP 220. SCP 240 can forward the call control information or caller identification information to SSP 220.

SN 250 preferably comprises a network element that can receive calls forwarded from SSP 220 or SCP 240 and can transmit messages to telephone stations 222, 262. SN 250 can generate announcements that can be transmitted to telephone stations 222, 262. SN 250 can transmit standard announcements to calling telephone stations 262, 222. SN 250 can alternatively transmit custom announcements, which are recorded by a user, to calling telephone stations 262, 222.

Database 242 preferably comprises a data storage element for use with SCP 240 as known to those skilled in the art. Database 242 preferably stores call control information that can be implemented by SSP 220 to control calls and implement services. Database 242 can also include the information regarding the implementation of different services as described above. This information can be searched to determine the service sought by the called party.

Central office 260 preferably comprises an AIN network switch as known to those skilled in the art. Central office 260 enables calls to be placed between calling telephone station 262 and called telephone station 222. Alternatively, central office 260 can comprise a non-AIN network switch.

Telephone stations 222, 262 preferably comprise analog telephone sets. Alternatively, telephone stations 222, 262 can comprise wireless, PCS, ISDN or any other form of communication station known to those skilled in the art.

Figure 4:
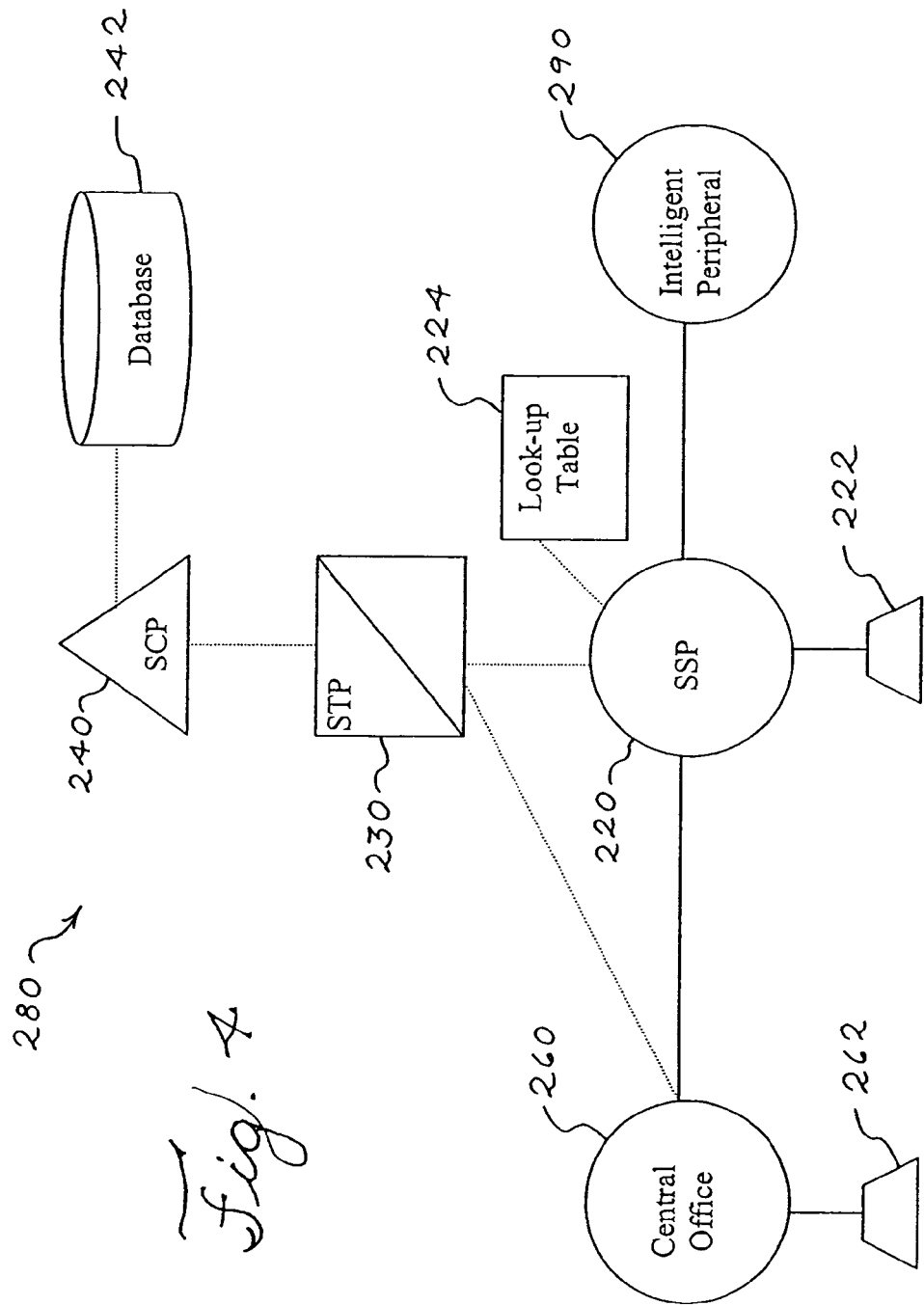
FIG. 4. is a block diagram of a second preferred embodiment of the telecommunications system of FIG. 1.

Referring now to FIG. 4, an alternate embodiment of the system of FIG. 3 is shown. The system 280 comprises an SSP 220; a called telephone station 222; a look-up table 224, an STP 230, an SCP 240; a SCP database 242, a central office 260 and a calling telephone station 262, all as described above in reference to FIG. 3. The system 280 also includes an intelligent peripheral (IP) 290 that communicates with SSP 220 and performs the same functions as the SN 250 as described herein.

Figure 5:
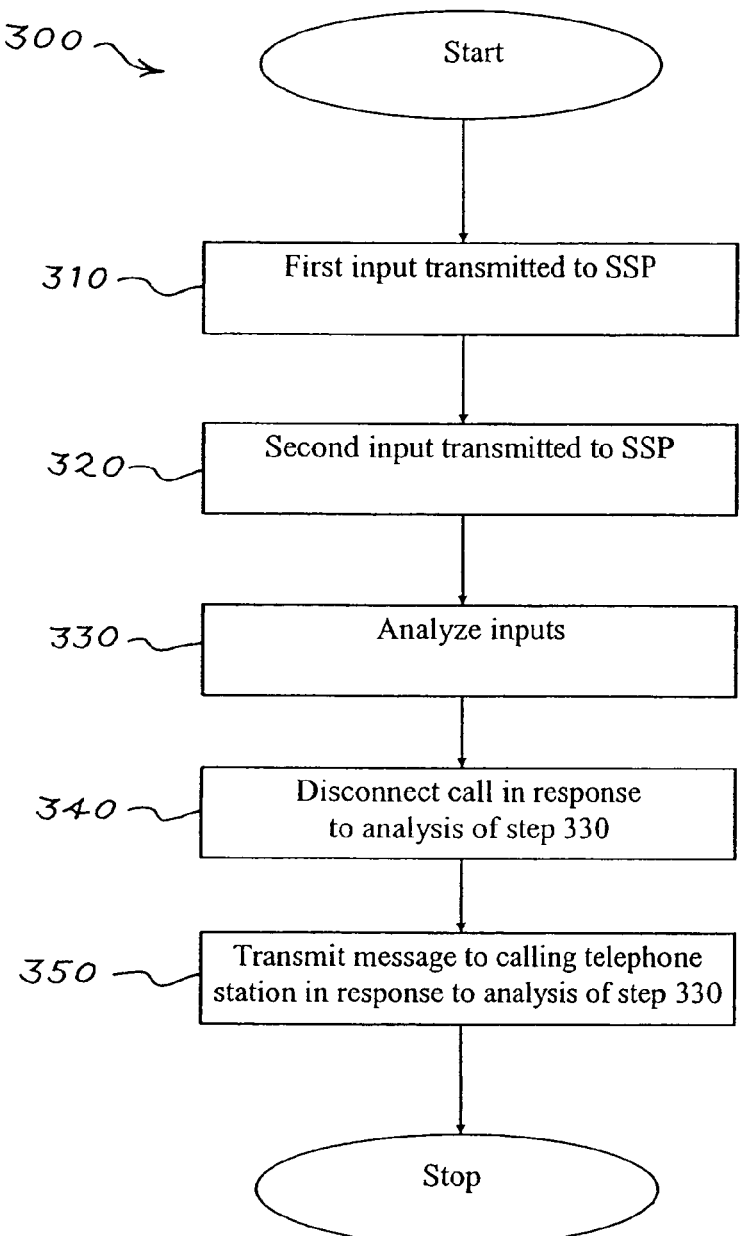
FIG. 5 is a flow chart of a method of a preferred embodiment for canceling a telephone call and transmitting a message to the calling communications station using the system of FIG. 3 or 4.

The systems depicted in FIGS. 3 and 4 can be utilized to implement the method 300 depicted in FIG. 5. For purposes of illustration, assume that a calling party at calling telephone station 262 places a call to a called party at called telephone station 222. The call originates from calling telephone station 262 and is routed to called telephone station 222 via central office 260 and SSP 220. A call is thereby established between calling telephone station 262 and called telephone station 222.

In this embodiment, when the called party decides that they wish to cancel the call, the called party provides a first input that is transmitted to SSP 220 (step 310). After providing the first input, the called party provides a second input which is also to be transmitted to SSP 220 (step 320). When SSP 220 receives the inputs, they are analyzed to determine what action the called party desires (step 330). If for example, it is determined that the called party seeks to cancel the call and send a message to the calling telephone station 262, SSP 220 disconnects the called telephone station 222 from the call (step 340). In addition to disconnecting the called telephone station 222, a message can be transmitted to the calling telephone station 262 (step 350). Since the call is canceled in response to a plurality of inputs, the present systems and methods can be configured to work in conjunction with other services, such as three-way calling for example, that are activated by the flash-hook.

In a preferred embodiment, the first input comprises a flash-hook and the second input comprises a series of DTMF tones. In alternative embodiments, the first and second inputs can comprise one or a combination of any suitable input(s) such as DTMF tones, flash-hook, dial pulse input, modem/fax input or voice input as known to those skilled in the art. For example, the plurality of inputs flash-hook, # (DTMF), 3 (DTMF) can be used to cancel a call and send a message to the calling party. In this example, the first input comprises the flash-hook and the second input comprises the # and the 3.

Figure 6:
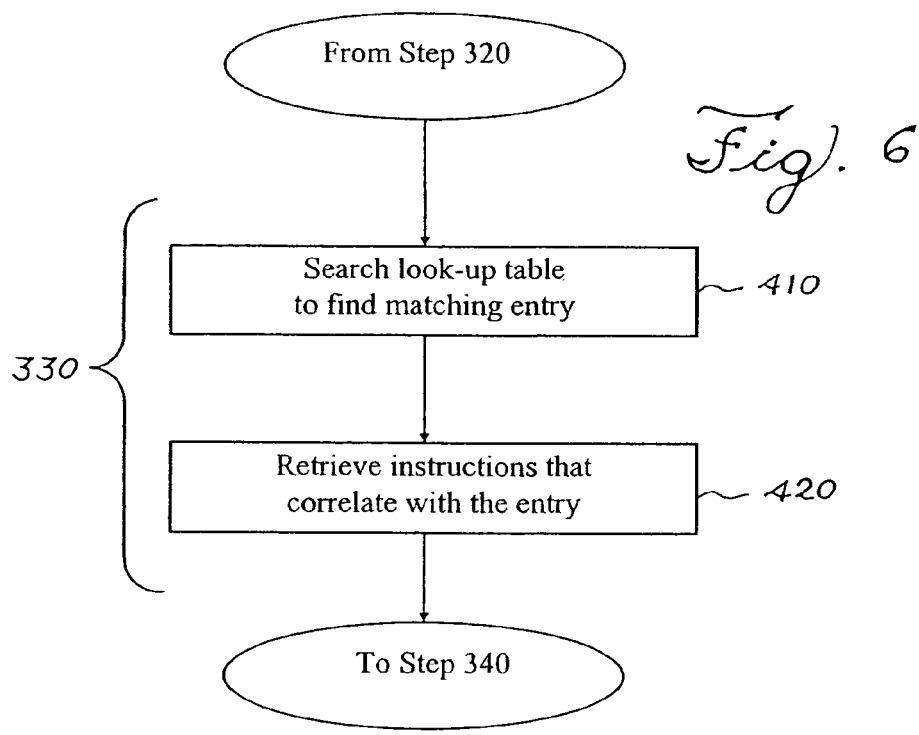
FIG. 6 is a more detailed flow chart of a portion the method of FIG. 5.

In a preferred embodiment, the step of analyzing the plurality of inputs from the called party (step 330) comprises the steps shown in FIG. 6. After receiving the plurality of inputs, SSP 220 utilizes a look-up table to determine the action sought by the called party. SSP 220 searches the look-up table (step 410) to find the entry that matches the plurality of inputs. If SSP 220 finds a match, it retrieves instructions that correlate to the entry (step 420). The instructions enable the SSP 220 to perform the action sought by the called party. These functions can include canceling the call and transmitting a message to the calling telephone station as described herein.

Figure 7:
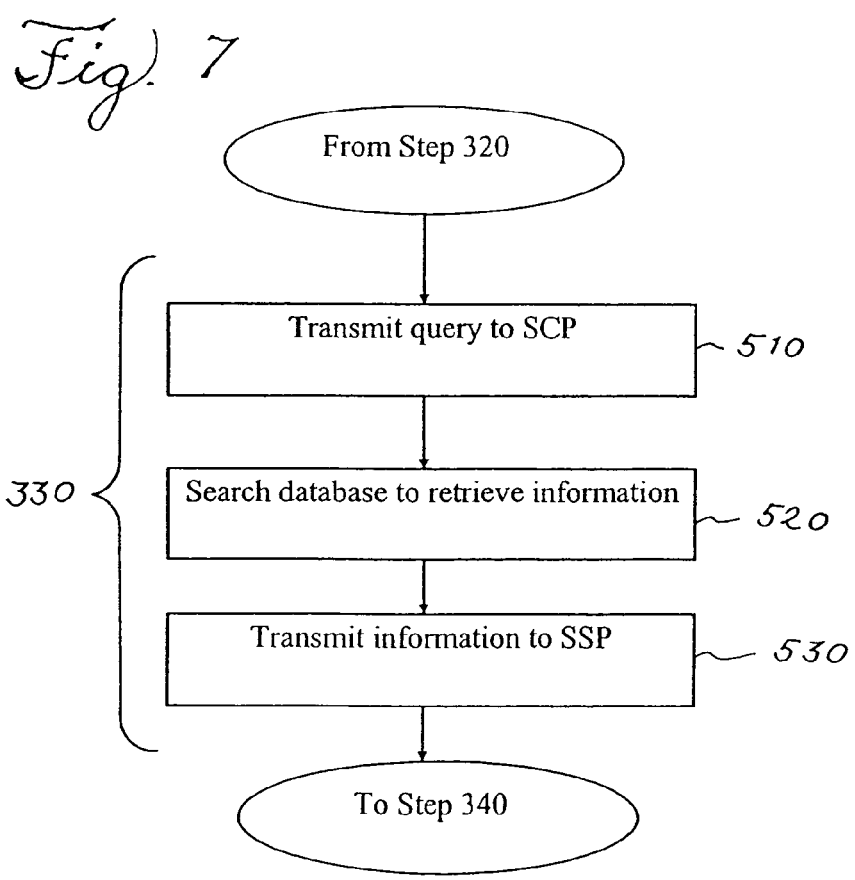
FIG. 7 is a more detailed flow chart of a portion of the method of FIG. 5.

In an alternative embodiment, the step of analyzing the plurality of inputs from the called party (step 330) comprises the steps shown in FIG. 7. After the called party transmits the plurality of inputs to the SSP 220, instead of accessing the look-up table, SSP 220 can generate a query to SCP 240 requesting information corresponding to the plurality of inputs provided by the called party (step 510). The SCP 240 can search database 242 and obtain information corresponding to the plurality of inputs (step 520). After SCP 240 obtains the information, it can transmit this information to SSP 220 (step 530). SSP 220 can use this information in order to perform the operations described herein.

Figure 8:
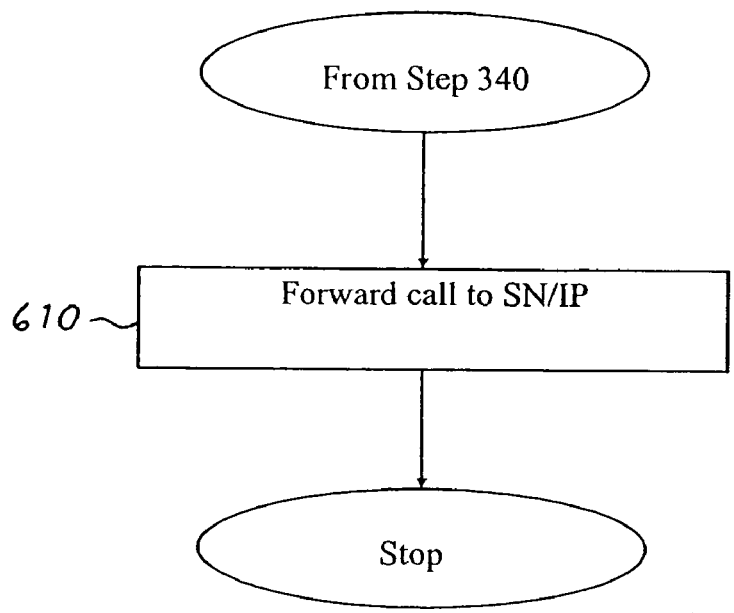
FIG. 8 is flow chart of an alternative method for canceling a telephone call and transmitting a message to the calling communications station using the system of FIG. 3 or 4.

In a preferred embodiment, SSP 220 forwards the call to SN 250/IP 290 prior to step 350 as shown in FIG. 8. After disconnecting the called telephone station 222 (step 340), SSP 220 can forward the call to SN 250/IP 290 (step 610). After receiving the call from SSP 220, SN 250/IP 290 can transmit a message to the calling telephone station (step 350). In an alternative embodiment, SSP 220 can transmit a message to the calling telephone station.

Figure 9:
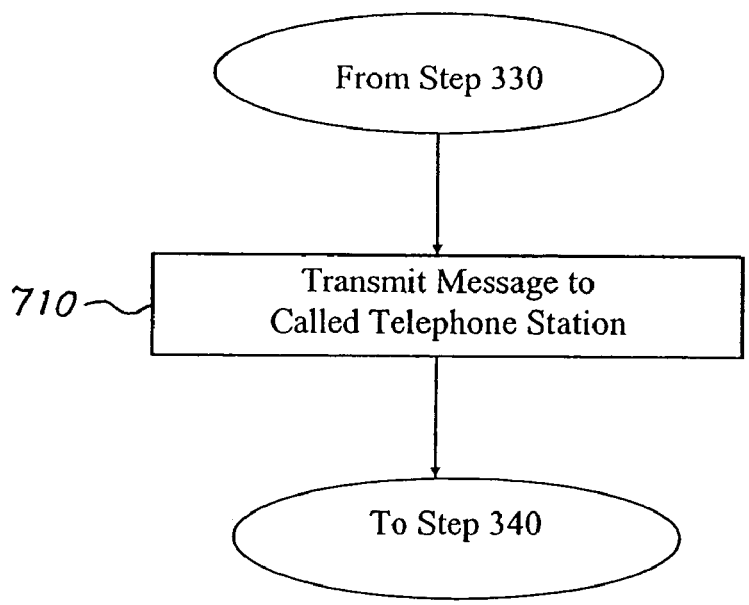
FIG. 9 is flow chart of an alternative method for canceling a telephone call, transmitting a message to the calling communications station, and transmitting a message to the called communications station using the system of FIG. 3 or 4.

In an alternative embodiment, a confirmation message is transmitted to the called telephone station 222 prior to step 340 as shown in FIG. 9. After the inputs have been analyzed (step 330) SSP 220 can transmit a confirmation message to the called telephone station that indicates that the call has been canceled. The confirmation message can also indicate that a message will be transmitted to the calling telephone station 262. Alternatively, the confirmation message can be transmitted by the SN 250 or IP 290.

The message and the confirmation message preferably comprise audible information. The message and the confirmation message can comprise a standard message generated by SN 250, IP 290, or SSP 220. Alternatively, the message and the confirmation message can comprise a custom message recorded by the called party. In an alternative embodiment, the message and the confirmation message can comprise text or data. The message sent to the calling party can comprise, for example, a request for the removal of the called party from telemarketer's call list.

The specific message transmitted by SN 250, IP 290, or SSP 220 is preferably selected in response to input provided by the called party. The called party can provide different inputs, of the type indicated above, that can be used to signify different custom or standard messages. In response to the input provided by the called party, SN 250, IP 290, or SSP 220 can determine the message sought by the called party and can transmit the appropriate message to the calling telephone station 262.

In a further alternative embodiment, if the called party fails to provide an appropriate second input within a predetermined amount of time, the call can be reestablished between the calling telephone station 262 and the called telephone station 222.

The present embodiments provide an efficient and effective method and system for canceling an unwanted call and transmitting messages to the person placing the call.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A method for canceling a call, the method comprising:
   (a) analyzing a plurality of inputs transmitted from a called telephone station, where the plurality of inputs are selected from the group consisting of DTMF tones, flash-hook, dial pulse input, modem/fax input, and voice input;
   (b) transmitting a message to a calling telephone station; and
   (c) canceling a call placed to the called telephone station.

2. The method of claim 1, wherein (a) comprises determining whether a user at the called telephone station seeks to cancel the call.

3. The method of claim 1, wherein (a) comprises determining whether a user at the called telephone station seeks to send a message to the calling telephone station.

4. The method of claim 1, wherein (a) comprises determining whether a user at the called telephone station seeks to cancel the call and send a message to the calling telephone station.

5. The method of claim 1, wherein (b) comprises transmitting a message to the calling telephone station indicating that a user at the called telephone station does not accept calls from solicitors.

6. The method of claim 1, wherein (b) comprises transmitting a message to the calling telephone station requesting that the telephone number associated with the called telephone station be removed from a call list.

7. The method of claim 1, wherein (b) comprises transmitting a message to the calling telephone station requesting that a caller at the calling telephone not call the telephone number associated with the called telephone station again in the future.

8. The method of claim 1, further comprising:
   (d) transmitting a confirmation message to the called telephone station.

9. The method of claim 8, wherein the confirmation message comprises an indication that the call has been canceled.

10. A system for canceling a call, the system comprising:
    at least one telecommunications network element operative to:
    (a) analyze a plurality of inputs transmitted from a called telephone station, where the plurality of inputs are selected from the group consisting of DTMF tones, flash-hook, dial pulse input, modem/fax input, and voice input;

(b) transmit a message to a calling telephone station; and (c) cancel a call placed to the called telephone station.

11. The system of claim 10, wherein the at least one telecommunications network element is further operative to determine whether a user at the called telephone station seeks to cancel the call.

12. The system of claim 10, wherein the at least one telecommunications network element is further operative to determine whether a user at the called telephone station seeks to send a message to the calling telephone station.

13. The system of claim 10, wherein the at least one telecommunications network element is further operative to transmit a message to the calling telephone station indicating that a user at the called telephone station does not accept calls from solicitors.

14. The system of claim 10, wherein the at least one telecommunications network element is further operative to transmit a message to the calling telephone station requesting that the telephone number associated with the called telephone station be removed from a call list.

15. The system of claim 10, wherein the at least one telecommunications network element is further operative to transmit a confirmation message to called telephone station.

16. The method of claim 15, wherein the confirmation message comprises an indication that the call has been canceled.

17. The system of claim 10, wherein the at least one telecommunications network element comprises a service switching point.

18. The system of claim 10, wherein the at least one telecommunications network element comprises a service control point.

19. The system of claim 10, wherein the at least one telecommunications network element comprises a service node.

20. The system of claim 10, wherein the at least one telecommunications network element comprises an intelligent peripheral.

\* \* \* \* \*